United States Patent [19]
Kanaya et al.

[11] 3,890,588
[45] June 17, 1975

[54] WATER JACKET TEMPERATURE SENSOR

[75] Inventors: Iwao Kanaya; Kazuo Ishikawa; Hideo Mifune, all of Osaka, Japan

[73] Assignee: Matsushita Electric Industrial Co., Ltd., Japan

[22] Filed: Oct. 23, 1973

[21] Appl. No.: 408,948

[30] Foreign Application Priority Data
Oct. 26, 1972 Japan.............................. 47-123675
Dec. 13, 1972 Japan.............................. 47-143504
Dec. 13, 1972 Japan.............................. 47-143505
Dec. 13, 1972 Japan.............................. 47-143506
Feb. 19, 1973 Japan.............................. 48-21419
May 21, 1973 Japan.............................. 48-59952

[52] U.S. Cl. ............ 338/28; 73/362 AR; 338/22 R; 338/30
[51] Int. Cl. .......................... H01c 7/00; G01k 7/00
[58] Field of Search ... 338/22, 23, 28, 22 R, 22 SD, 338/25, 28, 30, 23; 73/351, 362 R, 362 AR, 362 SC

[56] References Cited
UNITED STATES PATENTS
2,590,041 3/1952 Roost.................................. 338/28
2,780,703 2/1957 MacIntyre........................... 338/28
2,838,935 6/1958 Cecio et al.......................... 338/28
3,754,201 8/1973 Adams................................ 338/28

*Primary Examiner*—A. Bartis
*Attorney, Agent, or Firm*—Robert E. Burns; Bruce L. Adams; Emmanuel J. Lobato

[57] ABSTRACT

A plurality of thermistors extend transversely of and are disposed longitudinally in an axial bore of a metal housing having a closed end and an open end. A plurality of spacers are provided for electrically isolating the thermistors and biasing springs urge the thermistors toward the closed end to establish a thermally conductive path therebetween. Conducting wires extend through the bore to establish connections to the thermistors to provide individual thermally responsive resistive circuits. The open end portion of the housing is filled with an insulating mould cap to provide fluid tight sealing.

9 Claims, 7 Drawing Figures

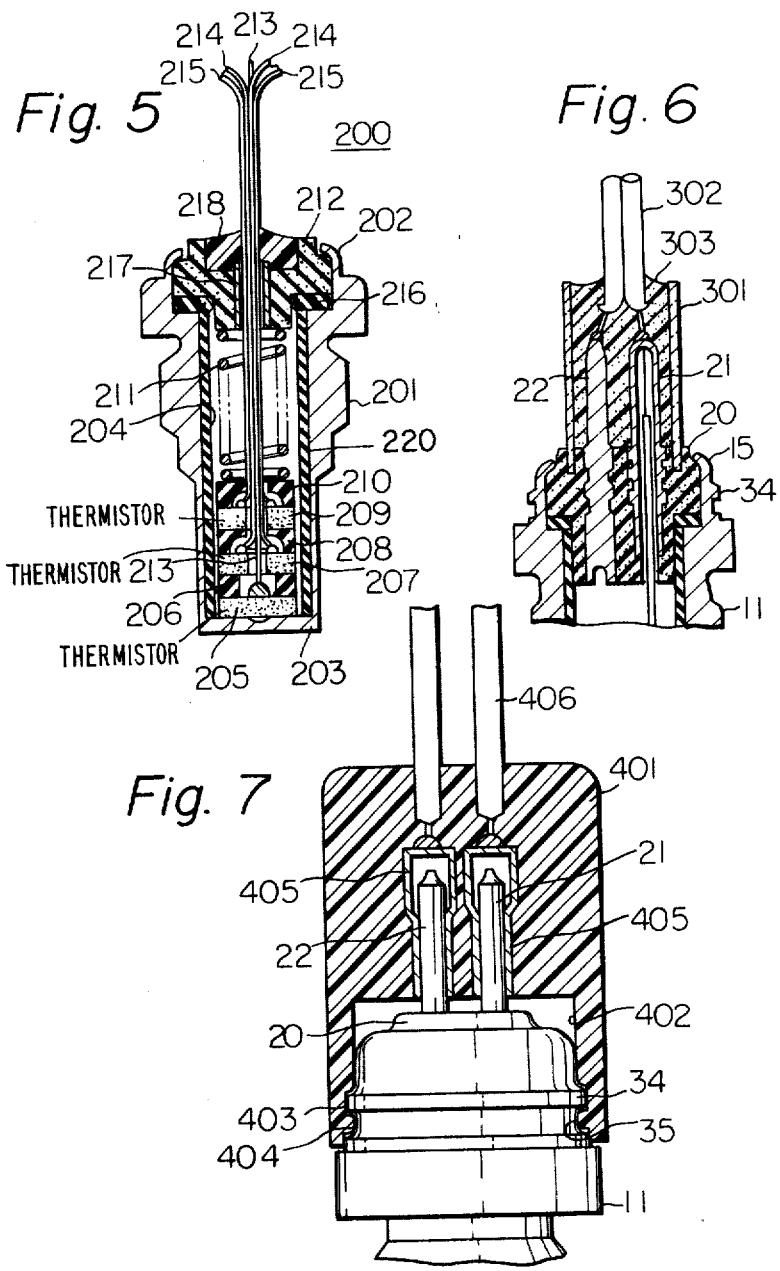

WATER JACKET TEMPERATURE SENSOR

The present invention relates generally to temperature sensors, and in particular to improvements to water jacket temperature sensors used for sensing the temperature of the coolant circulating in an internal combustion engine block.

In an internal combustion engine, a cooling system is provided with a water pump which circulates the coolant. The engine block of the modern engine is full-length water-jacketed to prevent uneven cooling and consequent distortion of the cylinder walls. To keep the driver aware of the operating condition of the engine, the water pump is provided with a temperature sensor at the coolant outlet pipe. A plurality of thermal resistive elements such as thermistors are contained in the sensor for different purposes; one for indicating the operating temperature of the engine on the dashboard and another for alerting the driver when the engine is heated up to the critical temperature.

Since the thermistor is usually liable to alter its thermal resistive characteristic to changing environmental conditions, important considerations are to provide less variation of characteristic before and after installation into a sensor housing.

In a prior art sensor, thermistors are spacedly placed in the sensor housing in parallel with the longitudinal axis thereof and embedded in an elastic resin, such as silicon resin, to form a one piece construction with the housing. A disadvantage is that the thermal resistive response characteristic of the thermistors thus embedded in an elastic resin would differ from that measured in an atmospheric environment before installation into the housing, and that it is usually difficult to correlate the different environmental conditions. In the production line, therefore, it is necessary to make measurement tests before and after installation to attain the desired response characteristic. Furthermore, it takes a long time for the embedding resin to become stabilized to ensure that the thermistors provide constant thermal response characteristics. Therefore, this could result in an increase in the amount of yield. In addition, it is usually difficult to precisely hold the thermistors at a predetermined spacing, which often results in thermal interference therebetween. A further disadvantage is that a faulty component cannot easily be replaced with a new one because of the one-piece construction.

Briefly described, the present invention is characterized by an improved temperature sensor in which a plurality of thermal resistive elements, e.g. thermistors are spacedly disposed transversely to the longitudinal axis of the housing having a closed end and an open end. A plurality of insulating spacers are provided between the thermistors to provide electrical isolation. Metal plates are disposed on one surface of the thermistors to serve as a conducting path not only for a current but for heat generated in the thermistors to the outside. Heat conducting insulating liquid such as silicon oil fills the interspaces provided between the thermistors and the housing. Since the thermistors are installed into the housing one upon another with a spacer therebetween at a predetermined spacing, the sensor can be fabricated at a high rate and the response characteristics are likely to vary less than the prior art. As plurality of biasing means are provided between the thermistors to urge them toward the closed end of the housing to ensure that a good electrical contact is provided between the thermistors and the housing.

It is accordingly an object of the present invention to provide an improved water jacket temperature sensor which can be produced at a high rate, increasing the yield.

Another object of the present invention is to provide an improved water jacket temperature sensor which assures a fast thermal response time.

A further object of the present invention is to provide an improved water jacket temperature sensor which facilitates measurement tests.

These and other objects and features of the present invention will be better understood from the following description taken in conjunction with the accompanying drawings, in which:

FIG. 5 is a cross-sectional view in elevation of a third preferred embodiment of the temperature sensor in accordance with the present invention;

FIG. 6 is a cross-sectional fragmentary view of a variation of the FIG. 1 embodiment;

FIG. 7 is a cross-sectional fragmentary view of another variation of the FIG. 1 embodiment.

Figure 1:
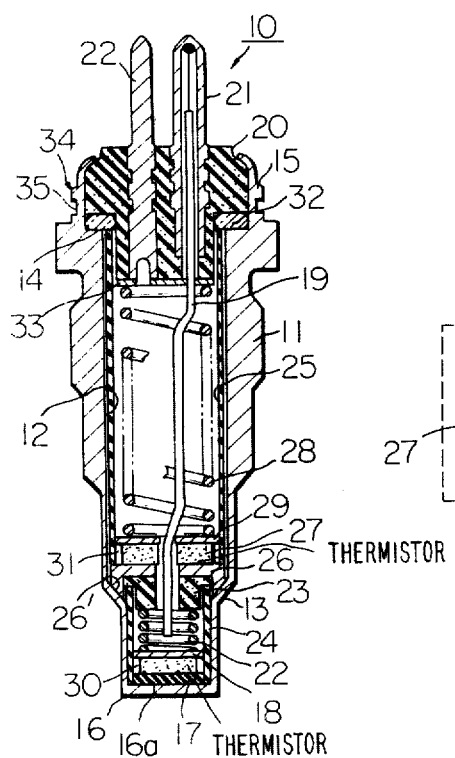
FIG. 1 is a cross-sectional view in elevation of a first preferred embodiment of a water jacket temperature sensor in accordance with the present invention.
Figure 2:
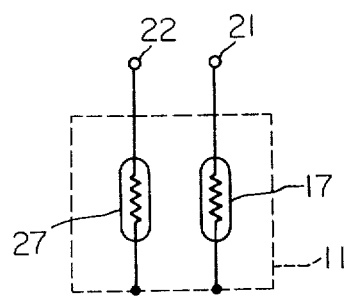
FIG. 2 shows an equivalent circuit of the temperature sensor of FIG. 1.

Referring now to FIG. 1, there is shown a first preferred embodiment of a water jacket temperature sensor in accordance with the present invention. The water jacket temperature sensor 10 comprises a cylindrical metal housing 11 having an open end 15, a closed end 16 and a stepped bore 12 with cross-sectional areas of varying diameter with shoulder portions 13 and 14 therebetween. A disc-shaped thermistor 17 is placed on the bottom wall 16, of the housing preferably with a metal disc 16a interposed therebetween. The metal disc 16a serves as an element for increasing radiation of heat generated in the thermistor 17. A metal disc 18 is disposed on the upper surface of the thermistor 17 to serve as an electrode to provide contact with outer circuitry. An insulating cylindrical member 24 is disposed on the inner wall of the housing 11 to isolate the upper electrode of the thermistor 17 from the housing. A spring 22 is disposed on the metal plate 18 axially with respect to the bore 12 to urge the thermistor 17 toward the closed end 16 to secure a good electrical contact with the housing. On the spring 22 are seated a ring-shaped insulator spacer 23 having a flanged portion and a metal disc 26 having a downwardly flared portion which engages the shoulder portion 13 to determine the extent of pressure exerted on the thermistor 17 by a spring 28 which will be described hereinbelow. The metal disc 26 has on its upper surface a ring-shaped thermistor 27 in parallel with the thermistor 17 and transverse to the longitudinal axis of the housing 11 to serve as an electrical connection between thermistor 27 and the housing 11. A ring-shaped metal member 29 is placed in contact with the thermistor 27 to assure a good electrical contact between the thermistor 27 and the spring 28 disposed axially in the bore 12 to serve as another path for current to the thermistor 27. A covered conducting wire 19 extends into the bore and connects to the metal disc 18 to provide a connection with an extenal circuit. A tubular insulator 25 is axially disposed in the bore 12 to insulate the coil spring 28, the thermistor 27 and the ring-shaped metal 29 from the housing 11. A ring shaped insulator 32 is seated on the shoulder portion 14. The open end portion 15 is filled with an insulating mould cap 20 to provide a fluid-tightly sealed chamber in the housing. Into the mould cap 21 are embedded a tubular terminal 21 for connection to the lead 19 and a terminal 22 for connection to the spring 28 through a metal disc 33 having an aperature to allow the conducting lead 19 to pass therethrough to the terminal 21. Each of the terminals 21 and 22 has a plurality of annular enlargements to provide a firm grip with the mould cap 20. An insulating tubular member 24 is also inserted into the bore 12 adjacent the end portion 16 to provide insulation between the housing and metal plate 18. It will be understood that the terminal 21 serves as an electrode for the thermistor 17 and the terminal 22 for the thermistor 27, while the metal housing 11 serves as a common electrode for both of the thermistors 17 and 27, which is shown in an equivalent circuit in FIG. 2. Preferably, the thermistors 17 and 27 have a cross-sectional area smaller than the inner diameter of the tubular insulators 24 and 25 so that interspaces 30 and 31 are provided which are filled with heat-conducting insulating material such as, for example, silicon oil, which serves to increase the thermal response characteristics of the thermistors 17 and 27. The housing 11 is further provided with an annular enlargement 34 and an annularly recessed portion 35 at the outer periphery of the open end portion 15 to provide engagement with an enclosing member will be described in connection with FIGS. 6 and 7.

The terminals 21 and 22 thus projecting from the housing serve to facilitate testing of the temperature sensor 10 because of the easily accessible construction. This is particularly important for mass production where every product is tested under the conveyor belt system. After the temperature sensor has been tested using the projecting terminals, the terminals must be covered with protective means having a plurality of conducting wires as shown in FIGS. 6 and 7. In FIG. 6, a tubular member 301 is embedded partly into the mould cap 20 in such a way as to surround the terminals 21 and 22. A pair of insulator-coated wires 302 are connected to the terminals 21 and 22 by soldering at an intermediate position in the tubular member 302. The tubular member 301 is filled with a plastic resin 303 to provide a one-piece construction with the temperature sensor 11 proper. An alternative protective means is shown in FIG. 7 and comprises an insulating enclosure 401 having a recessed portion 402 and preferably an annular groove 403 and an annular enlargement 404 at one end thereof complementary to the enlargement 34 and recess 35 of the housing 11, respectively, so that the enclosure 401 removably engages the open end portion of the sensor housing 11. The enclosure 401 is further provided with a pair of metal sleeves 405 embedded entirely thereinto at a suitable spacing therebetween to engage the terminals 21, 22 when the enclosure is fully engaged with the sensor housing 11. A pair of insulated wires 406 extends into the enclosure and is soldered to the sleeves 405.

Figure 3:
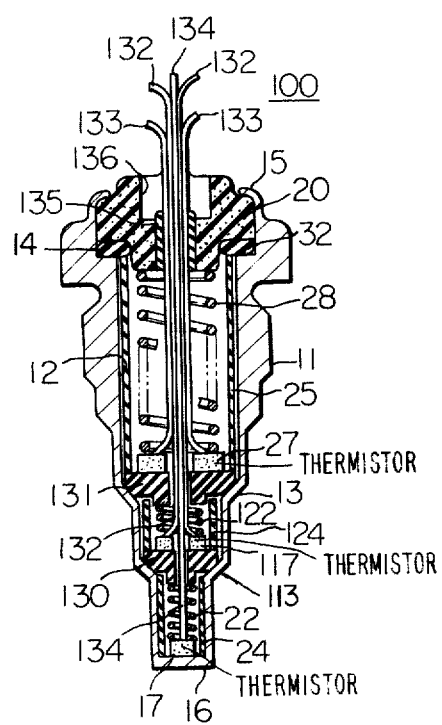
FIG. 3 is a cross-sectional view in elevation of a second preferred embodiment of the temperature sensor in accordance with the present invention.
Figure 4:
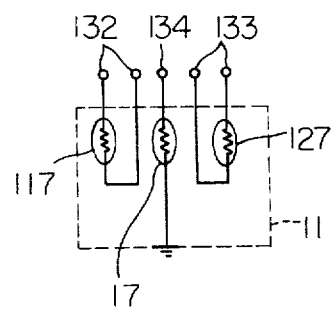
FIG. 4 shows an equivalent circuit of the temperature sensor of FIG. 3.

Turning now to FIG. 3 there is shown a modified form of the embodiment of FIG. 1, in which like parts are numbered with numerals similar to that shown in FIG. 1. The sensor 100 comprises a housing 11 similar in all respects to the housing 11 of the FIG. 1 embodiment except that the stepped bore 12 has an additional shoulder portion 113 for accommodation of an additional thermal resistive element 117. In the bore 12, three thermistors 17, 117 and 27 are disposed transversely to the longitudinal axis of the housing in spacedly parallel relationship with one another. The thermistor 117 is of the ring-shaped type similar to the thermistor 27 with their opposite terminals appearing on the upper surface. The thermistor 117 is urged toward the closed end portion 16 by a biasing element 122 confined in the intermediate portion of the housing 11 defined by the insulator spacers 130 and 131 and an insulating wall 124. A pair of insulator-coated leads 132 are connected to the terminals of the thermistor 117 and extend into the bore 12 through the open end portion 15. Similarly, a pair of insulator coated leads 133 is connected to the terminals of the thermistor 27, and a lead 134 to one terminal of the thermistor 17. Since electrical connections to the thermistors 117 and 27 are made independently from one another and the housing 11 serves as an electrode for the thermistor 17, the equivalent circuit is as shown in FIG. 4. The open end portion 15 of the housing 11 similarly accommodates an insulating mould cap 20 having an axial recess 136 through which the leads 132, 133 and 134 extend. The leads 132, 133 and 134 are surrounded with a rubber packing 135 and the axial recess 136 is filled with epoxy resin to provide fluid tight sealing. The rubber packing 32 is also provided between the lower surface of the flanged portion of the mould cap 20 and the shoulder portion 14 to provide fluid tight sealing. The mould cap 20 is held fixed in position by the inwardly flared portion of the open end 15.

Another modified form of the water jacket temperature sensor is shown in FIG. 5. The sensor 200 comprises a housing 201 having an open end portion 202, closed end portion 203 and a bore 204 extending axially thereinto. A disc-shaped thermistor 205 is disposed on the bottom 203 of the housing 201 and in electrical contact therewith. A ring insulator spacer 206 is disposed on the thermistor 205 to provide insulation from a ring-shaped thermistor 207 disposed thereon. Ring-shaped thermistors 207 and 209 as employed in the FIG. 3 embodiment are piled up one upon the other, with a ring-shaped insulator 208 being interposed therebetween for isolation purposes in a manner similar to that described above. A tubular insulator 220 is disposed on the inner wall of the bore 204 to provide insulation of thermistors 205, 207 and 209 from the metal housing 201. A ring-insulator spacer 210 may preferably be disposed on the thermistor 209. A coil spring 211 axially extends into the bore 204 and is disposed on the insulator 210. The upper end portion of the spring 211 engages the downwardly projected portion of a mould 212 which is held in positon by the inwardly flared portion of the open end portion 202 of the housing. An insulator-coated lead 213 extends through the mould cap 212, into the bore 204 and is soldered to the upper surface or one electrode of the thermistor 205. A pair of leads 214 similarly extends into the bore 204 substantially in parallel with the lead 213 and is soldered to the thermistor 207, and a pair of leads 215 extending into the bore is also soldered to the thermistor 209. The coil spring 211 provides pressure to the thermistors 205, 207 and 209 in much the same way as previously described to secure a good electrical contact between the thermistor 205 and the housing 201. Numerals 216 and 217 are rubber packings to provide fluid tight sealings as previously described and a numeral 218 is a mould of epoxy resin which also provides a sealing function. Equivalent electrical circuits are similar to that shown in FIG. 4.

What is claimed is:

1. A device for sensing the variation of coolant temperature, comprising:
    a metal housing having a bore extending along the longitudinal axis thereof and forming closed and open end portions of said housing;
    an insulating cap member at said open end portion to fluid tightly seal said housing;
    a plurality of thermal resistive elements disposed in spaced parallel relationship to each other in said bore and each having a major dimension extending transversely to said longitudinal axis;
    a plurality of insulating means alternately arranged with said thermal resistive elements for electrically insulating said thermal resistive elements from each other;
    a plurality of means, axially arranged in contact with said thermal resistive elements, for urging said elements toward said closed end portion of the bore; and
    means for conducting current between said thermal resistive elements respectively and the outside of said housing.

2. A device as claimed in claim 1, wherein said thermal resistive elements are thermistors, at least one of said thermistors being electrically in contact with said housing, the remainder of said thermistors being ring-shaped for passing said current conducting means therethrough.

3. A device as claimed in claim 1, wherein said bore is a stepped bore having cross-sectional areas of varying diameter with shoulder portions therebetween.

4. A device as claimed in claim 3, wherein said insulating means are seated on said shoulder portions.

5. A device as claimed in claim 1, further comprising a plurality of metal members arranged in contact with each of said thermal resistive elements for conducting heat generated therein.

6. A device as claimed in claim 1, wherein each of said urging means has a decreasing pressure toward said closed end portion.

7. A device as claimed in claim 1, further comprising a plurality of terminals extending through said insulating cap member, one of said terminals being in contact with one of said urging means adjacent said insulating cap member.

8. A device as claimed in claim 7, further comprising a cylindrical apertured member partly embedded into said insulating cap member along said longitudinal axis to surround said terminals and conducting wires connected to said terminals in said apertured member, said apertured member being filled with an insulating mould.

9. A device as claimed in claim 7, further comprising an insulating enclosure removably engageable at one end thereof with said open end portion of said housing, a plurality of electrically conductive sleeves embedded in said enclosure to receive said terminals therein, a plurality of conducting wires connected to said sleeves, whereby, upon engagement between said enclosure and said open end portion, said terminals are received in said sleeves providing electrical contacts between said terminals and conducting wires.

* * * * *